May 8, 1928.
J. A. FULLILOVE
1,668,714
MACHINE FOR PASTING ACCUMULATOR GRIDS
Filed Aug. 1, 1925　　2 Sheets-Sheet 1
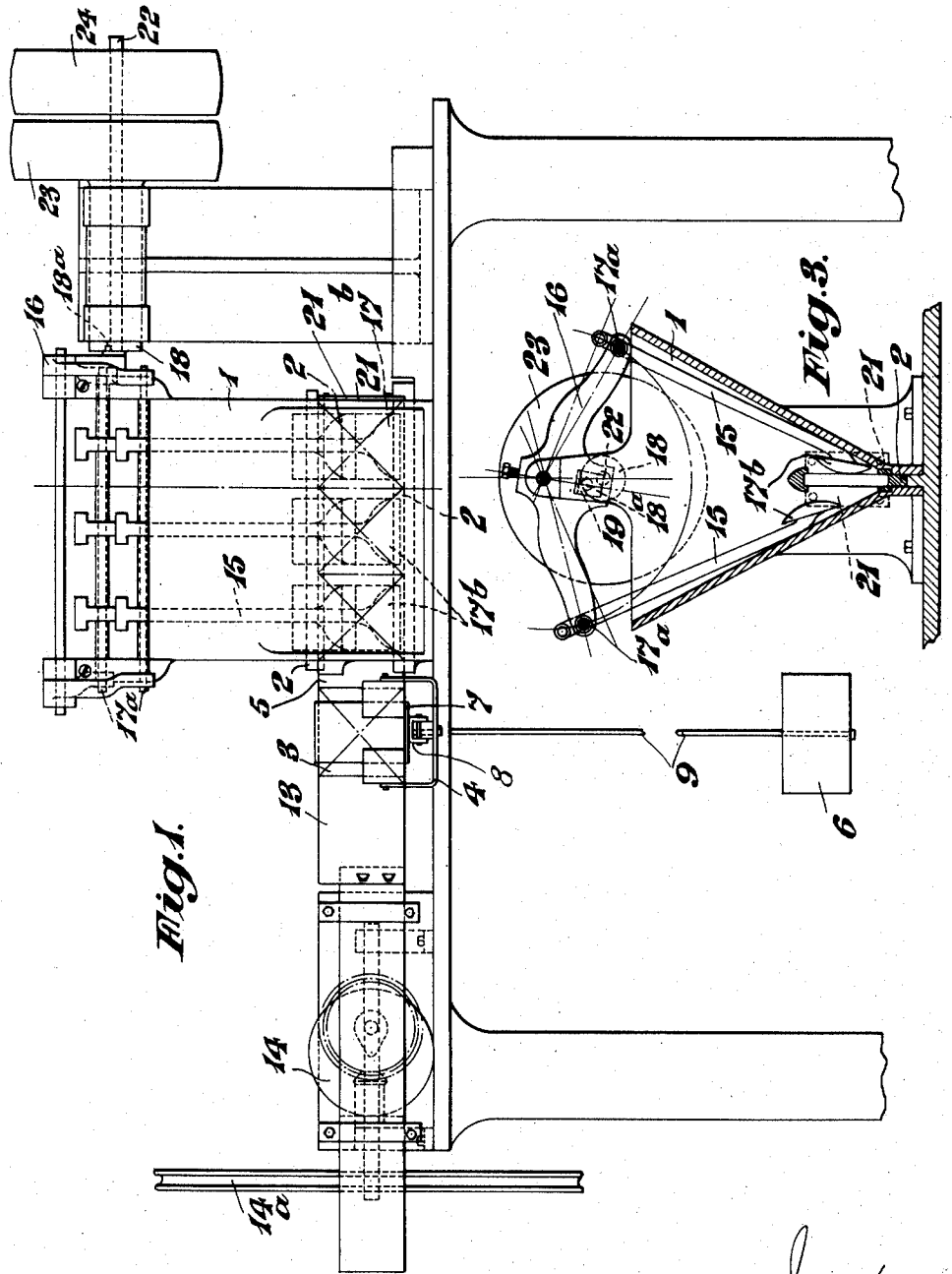

May 8, 1928.
J. A. FULLILOVE
1,668,714
MACHINE FOR PASTING ACCUMULATOR GRIDS
Filed Aug. 1, 1925    2 Sheets-Sheet 2
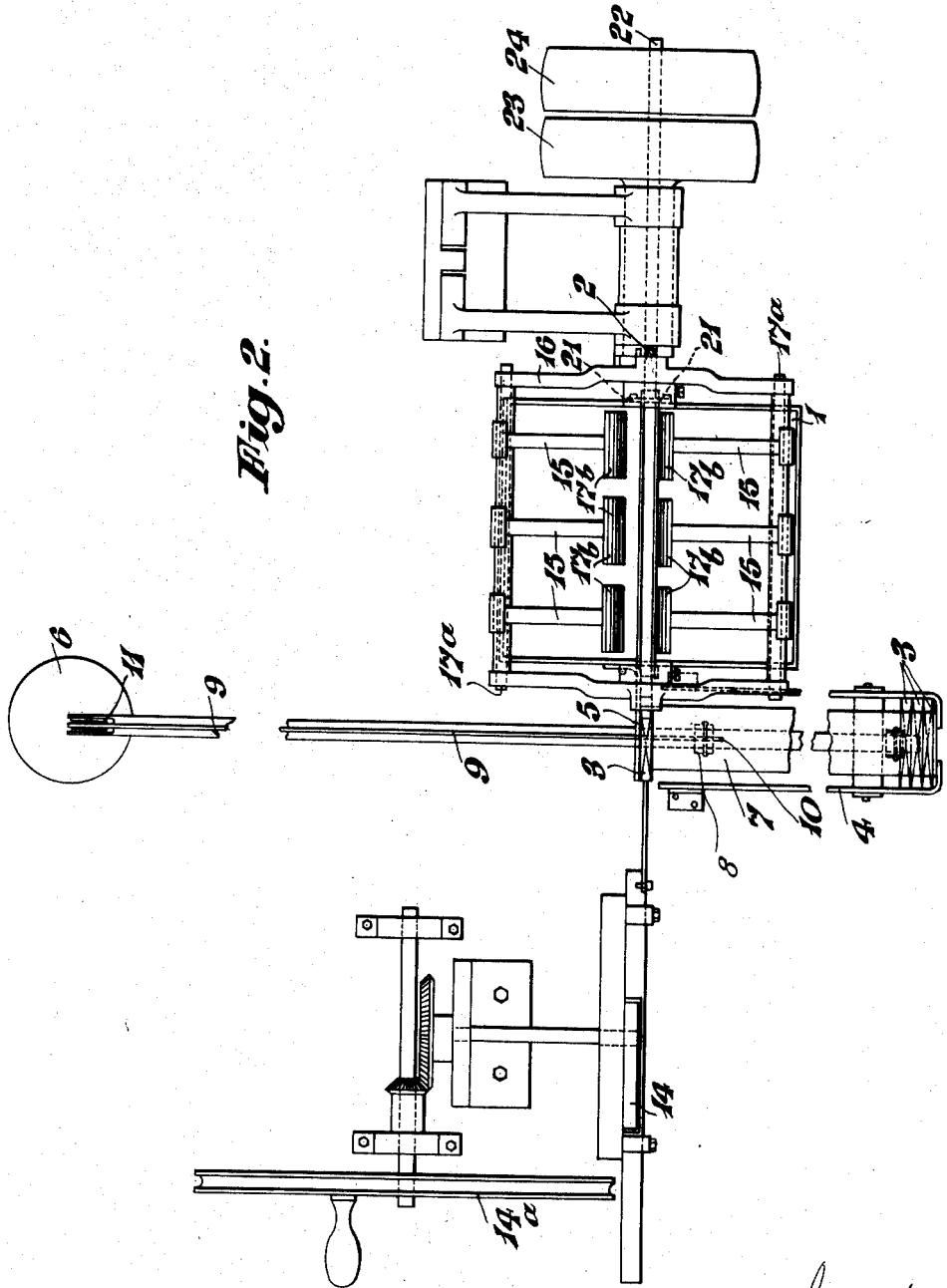

Patented May 8, 1928.

1,668,714

UNITED STATES PATENT OFFICE.

JOHN ALFRED FULLILOVE, OF MARKET HARBOROUGH, ENGLAND.

MACHINE FOR PASTING ACCUMULATOR GRIDS.

Application filed August 1, 1925, Serial No. 47,504, and in Great Britain August 6, 1924.

This invention relates to a machine for applying plastic material to plates or flat skeleton structures and is particularly adapted for the purpose of applying lead oxide or other paste to the grids of accumulators.

In the manufacture of accumulator plates according to a prior invention for which application for Letters Patent has been made Ser. No. 711,466 filed May 6th, 1924, it has been proposed to build the accumulator plate up from units a number of which are, after the pasting operation, combined in a structure. These units are, of course, provided with recesses or ridges to accommodate the usual lead oxide or other paste.

This pasting operation is usually effected by hand and is an inconvenient and more or less dangerous process.

The object of my invention is to provide a machine by means of which the plate or units can be pasted by machinery and the invention consists broadly of a machine which comprises essentially a hopper or container for the paste having a channel at its lower end through which the plates or units can pass, means for feeding the plates into the channel, means for applying the paste to the plates or units during their passage through the channel in the hopper and means for discharging the pasted units from the channel.

In the accompanying drawings I have illustrated a machine constructed in acordance with my invention Figure 1 being an elevational view, Figure 2 a plan view and Figure 3 a sectional view through the paste containing hopper.

Referring to these drawings, I provide a hopper 1 which is supplied with the mixed paste and the lower end of this hopper is provided with channels or guides 2 so that a plate or unit 3 can be forced into and through the hopper.

The plates or units 3 are arranged in a feeding trough or magazine 4 side by side, this feeding trough or magazine being aligned just in front of the bottom of the hopper and a wall or projection 5 is provided so that when the column of plates or units are pressed forward against it by the weight 6 pulling upon the movable wall 7 or other means a plate or unit lies against the wall or projection 5 and edgewise in alignment with the channel 2 of the hopper. On reference to the drawings it will be seen that the wall 7 is connected to a slide 8 to which a flexible connection 9 is attached at 10 the other end of this flexible connection being led over the pulley 11 and connected to the weight 6. A plunger or pusher 13 operated by a cam 14 or like mechanism is aligned with the positioned plate or unit 3 and operates to force the plate or unit into the channel 2 aforesaid in the bottom of the hopper. The stroke of the cam 14 is equal to the width of a plate or unit so that each plate or unit is moved a distance equal to its own width at each revolution of the cam.

The plunger 13 then returns to its normal position and another plate or unit is fed along the feeding trough or magazine 4 into alignment with the channel 2 in the hopper ready to be fed forward into pasting position and as this plate or unit moves forward it pushes the plate or unit already in the hopper out in front of it. The pasting operation is effected while the unit is in position in the channel in the bottom of the hopper.

This pasting is effected by means of angularly disposed pushers 15 within the hopper which are reciprocated continuously by a lever mechanism 16 actuated from a crank or eccentric 18. As the crank pin $18^a$ rotates it actuates the sliding block 17 which co-operates with the slot 19 in the rocking arm 16 causing the arm 16 to rock the pushers 15 pivoted at $17^a$ to the ends of the rocking arms so that they reciprocate and their ends $17^b$ push the paste into the openings in the positioned plates first from one side and then from the other.

These reciprocating pushers 15 thus perform the dual process of forcing the paste into the recesses in the plate or unit and also continuously agitating or kneading the paste in the lower part of the hopper. After one plate or unit has been pasted by a pair of the pushers another unpasted plate or unit is forced into the channel 2 pushing the fully pasted plate through the channel and past the scrapers 21 which smooth off the paste. The pasted plates may be removed by hand or may pass into a collecting stick or magazine if desired. In actual practice three or four plates are in the channel 2 together and at each operation each plate moves forward a distance equal to its own width so that a fresh plate or unit enters the channel and a pasted plate or unit leaves the channel.

Thus, in the machine illustrated where the channel 2 accommodates three plates or units each plate is subjected to the pasting operation three times before it finally emerges from the channel 2 it being understood that three sets of pushers 15 are provided so that the pasting operation is effected at each position. By this means the paste is firmly rammed into the plate or unit and all the perforations in the plate or unit are filled with the paste.

The pasted plates or units may if desirable be finally passed beneath a press so that the paste will be compressed into the recesses in the lead plate or unit and if desirable this pressing may be effected between sheets of absorbent material to ensure the removal of any excess moisture. The cam mechanism 14 in the machine illustrated, is driven from the driving pulley 14ª, which may be operated by hand or by belt, and the pasting mechanism is driven by a belt driven shaft 22, fast or loose pulleys 23 and 24 being provided in well known manner. It will be seen from the foregoing that units or complete plates can be pasted in the foregoing manner with the minimum of handling and the pasting operation is performed efficiently and considerably more rapidly than heretofore.

What I claim and desire to secure by Letters Patent is:—

1. A machine for applying plastic material to plates or flat skeleton structures comprising essentially a container for the plastic material open to the atmosphere a vertically disposed channel in the lower part of the hopper through which the plates can pass vertically and with both sides in contact with the mass of plastic material means for feeding the plates into and through the channel and mechanical tapping means for applying the paste to the plates on both sides simultaneously during the passage of said plates through the channel in the hopper.

2. A machine according to claim 1, wherein the plastic material is pushed into the plates from each side by continuously reciprocating pushers substantially as described.

In witness whereof I affix my signature.

JOHN ALFRED FULLILOVE.